United States Patent
Kamdar et al.

(10) Patent No.: US 11,392,803 B2
(45) Date of Patent: Jul. 19, 2022

(54) DECISION BOUNDARY ENHANCEMENT FOR LEARNING MODELS

(71) Applicant: INTERNATIONAL BUSINESS MACHINES CORPORATION, Armonk, NY (US)

(72) Inventors: Pravin Kamdar, Leander, TX (US); Richard Daniel Kimmel, Wappingers Falls, NY (US); David Winston, Buncombe, NC (US); Tong Li, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 712 days.

(21) Appl. No.: 16/430,734

(22) Filed: Jun. 4, 2019

(65) Prior Publication Data

US 2020/0387760 A1   Dec. 10, 2020

(51) Int. Cl.
*G06K 9/00*  (2022.01)
*G06K 9/62*  (2022.01)
*G06N 20/00* (2019.01)

(52) U.S. Cl.
CPC ......... *G06K 9/6269* (2013.01); *G06K 9/6231* (2013.01); *G06K 9/6257* (2013.01); *G06K 9/6264* (2013.01); *G06N 20/00* (2019.01)

(58) Field of Classification Search
None
See application file for complete search history.

(56) References Cited

U.S. PATENT DOCUMENTS

| | | |
|---|---|---|
| 6,327,581 B1 | 12/2001 | Platt |
| 7,054,847 B2 | 5/2006 | Hartman et al. |
| 7,542,959 B2 | 6/2009 | Barnhill et al. |
| 8,155,938 B2 | 4/2012 | Singhee et al. |

(Continued)

OTHER PUBLICATIONS

A. Singhee, "Statistical Blockade: Very Fast Statistical Simulation and Modeling of Rare Circuit Events and Its Application to Memory Design," in IEEE Transactions on Computer-Aided Design of Integrated Circuits and Systems, vol. 28, No. 8, pp. 1176-1189, Aug. 2009.

*Primary Examiner* — Soo Jin Park
(74) *Attorney, Agent, or Firm* — Cantor Colburn LLP; Samuel Waldbaum (57) ABSTRACT

Methods, systems, and computer program products for machine learning model decision boundary enhancement are provided. Aspects include determining a decision boundary associated with a first machine learning model, wherein the first machine learning model is trained with an initial training set of features and associated classifications from a verification model, obtaining a plurality of new feature sets, analyzing, by the first machine learning model, the plurality of new feature sets to determine that a subset of feature sets have classification predictions within a threshold range of the decision boundary associated with the first machine learning model, inputting the subset of feature sets into the verification model to determine enhanced training data based on outputs of the verification model, and creating an enhanced machine learning model by further training the first machine learning model with the initial training data and the enhanced training data.

20 Claims, 10 Drawing Sheets

(56) References Cited

U.S. PATENT DOCUMENTS

| | | |
|---|---|---|
| 2005/0049990 A1 | 3/2005 | Milenova et al. |
| 2005/0131847 A1 | 6/2005 | Weston et al. |
| 2006/0074908 A1 | 4/2006 | Selvaraj et al. |
| 2009/0228412 A1 | 9/2009 | Matsumoto et al. |
| 2020/0097389 A1* | 3/2020 | Smith ................. G06F 11/3612 |

* cited by examiner

DECISION BOUNDARY ENHANCEMENT FOR LEARNING MODELS

BACKGROUND

The present invention generally relates to machine learning, and more specifically, to decision boundary enhancement for learning models.

A decision boundary is the region of a problem space in which the output label of a classifier is ambiguous. That is to say, the classifier is unsure of how to classify a feature vector in a feature space. Typically, decision boundaries are utilized to determine a binary decision by a classifier such as, for example, a pass or fail, a yes or no, and the like. Features vectors that fall within a certain range of this decision boundary for the classifier tend to result in inaccurate classifications. For machine learning models (e.g., classifiers), creating a more accurate decision boundary and assist with producing more accurate models.

SUMMARY

Embodiments of the present invention are directed to a computer-implemented method for decision boundary enhancement. A non-limiting example of the computer-implemented method includes determining a decision boundary associated with a machine learning model, wherein the machine learning model is trained with an initial training set of features and associated classifications from a verification model. Then, obtaining a plurality of new feature sets, predicting by the machine learning model, using the plurality of new feature sets to determine that a subset of feature sets of the plurality of new features sets that have classification predictions within a threshold range of the decision boundary associated with the machine learning model, inputting the subset of feature sets into the verification model to determine enhanced training data based on associated output of the verification model, and creating an enhanced machine learning model by further training the first machine learning model with the initial training data and the enhanced training data.

Embodiments of the present invention are directed to a system for decision boundary enhancement. A non-limiting example of the system includes a processor coupled to a memory, the processor configured to perform determining a decision boundary associated with a machine learning model, wherein the machine learning model is trained with an initial training set of features and associated classifications from a verification model. Then, obtaining a plurality of new feature sets, predicting by the machine learning model, using the plurality of new feature sets to determine that a subset of feature sets of the plurality of new features sets that have classification predictions within a threshold range of the decision boundary associated with the machine learning model, inputting the subset of feature sets into the verification model to determine enhanced training data based on associated output of the verification model, and creating an enhanced machine learning model by further training the first machine learning model with the initial training data and the enhanced training data.

Embodiments of the invention are directed to a computer program product for decision boundary enhancement, the computer program product comprising a computer readable storage medium having program instructions embodied therewith. The program instructions are executable by a processor to cause the processor to perform a method. A non-limiting example of the method includes determining a decision boundary associated with a machine learning model, wherein the machine learning model is trained with an initial training set of features and associated classifications from a verification model. Then, obtaining a plurality of new feature sets, predicting by the machine learning model, using the plurality of new feature sets to determine that a subset of feature sets of the plurality of new features sets that have classification predictions within a threshold range of the decision boundary associated with the machine learning model, inputting the subset of feature sets into the verification model to determine enhanced training data based on associated output of the verification model, and creating an enhanced machine learning model by further training the first machine learning model with the initial training data and the enhanced training data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
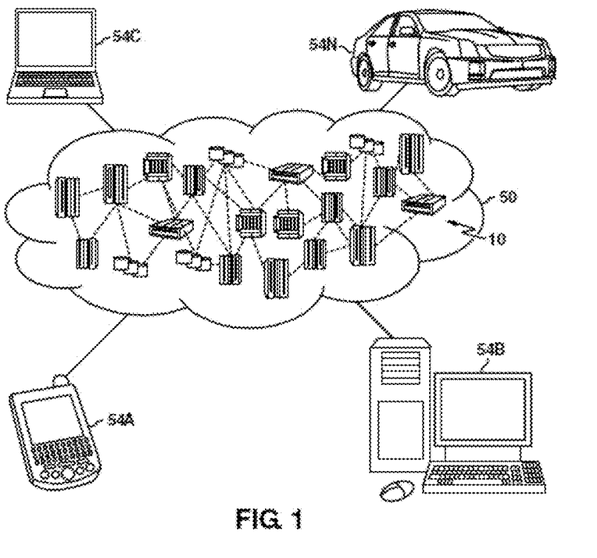
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
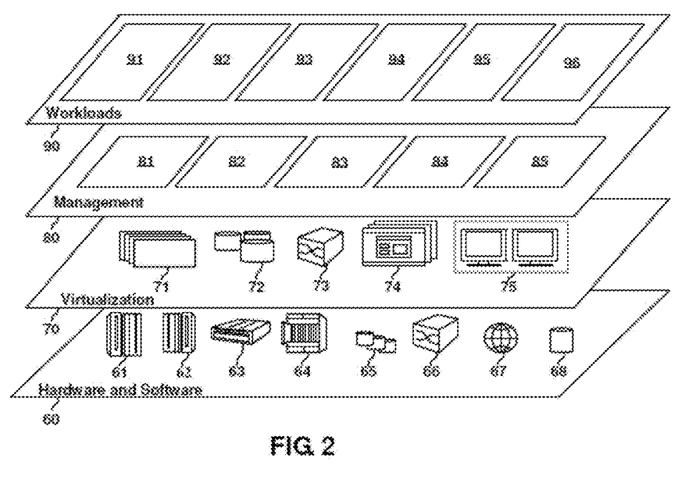
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decision boundary enhancement for learning models 96.

Figure 3:
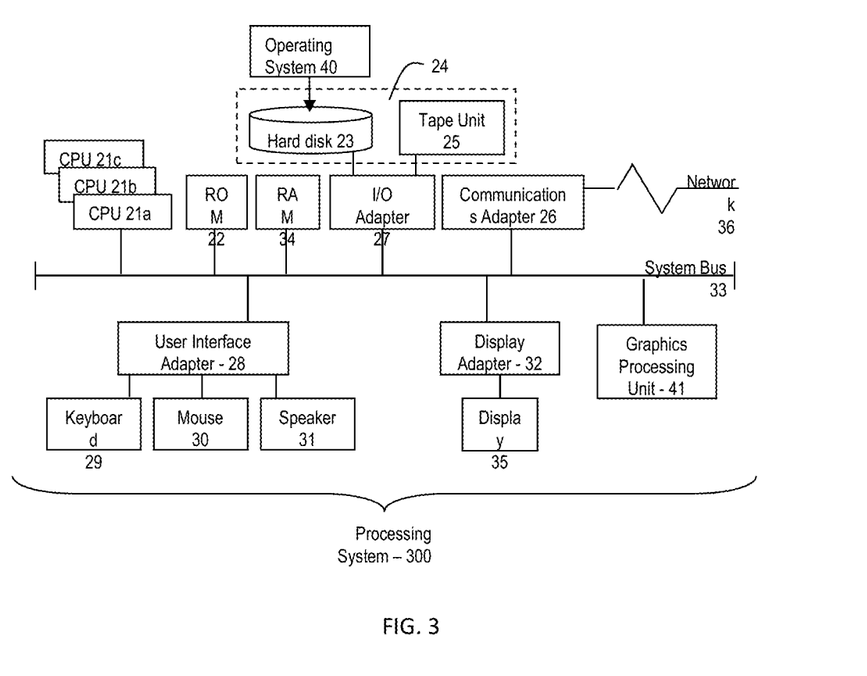
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
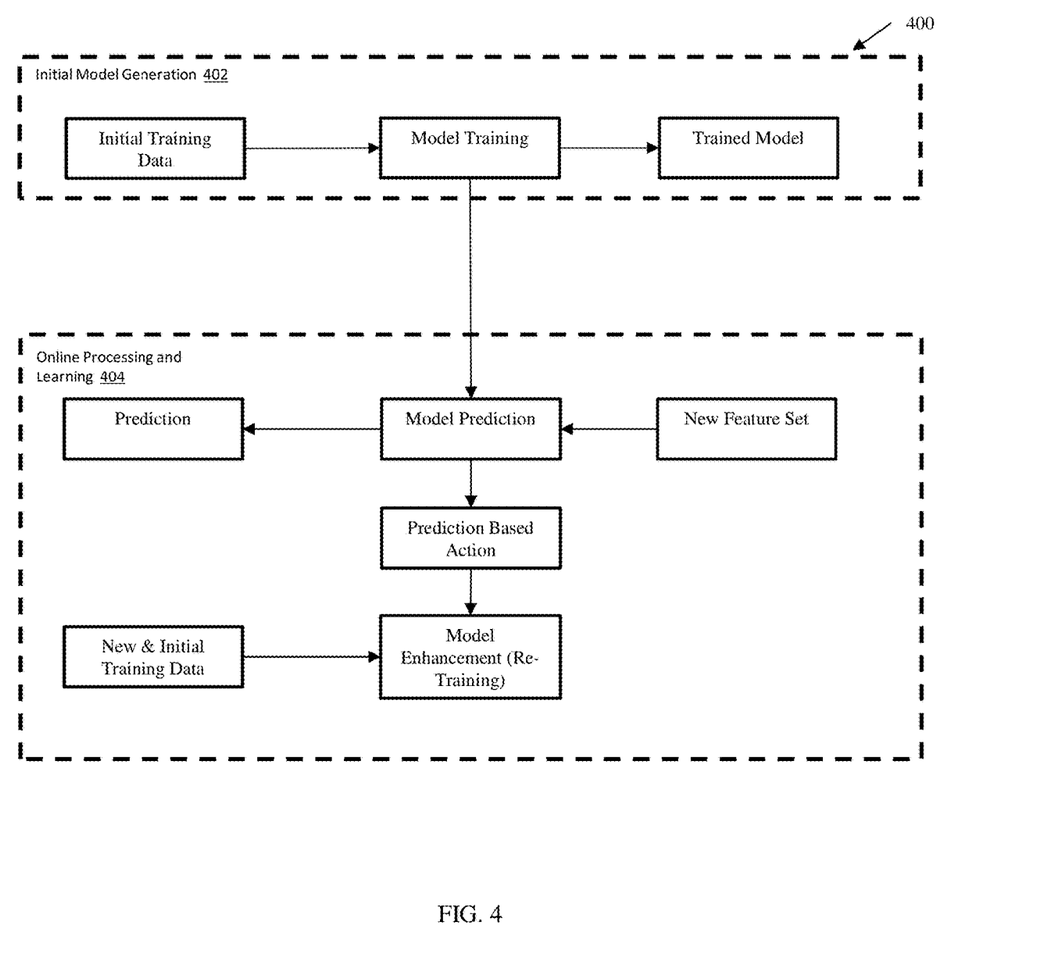
FIG. 4 depicts a flow diagram of training a machine learning model with online model enhancement according to one or more embodiments of the present invention.

Turning now to an overview of technologies that are more specifically relevant to aspects of the invention, FIG. 4 depicts a flow diagram of training a machine learning model with online model enhancement according to one or more embodiments of the present invention. The flow diagram 400 includes two phases related to training a machine learning model. The first phase is the initial model generation 402 and the second phase is the online processing and learning 404. During the initial model generation, a model is fitted to a set of initial training data which used as an input to a model training engine to produce a trained model. The initial training data includes known output (classified, or continuous value) for corresponding input (feature) values. Based on this initial training data, the model training using supervised machine learning determines a trained model in this initial model generation 402 phase. Next, the second phase includes online processing and learning 404. Herein, the trained model performs model prediction based on a new feature set that is inputted for model prediction to determine predictions (sometimes referred to as, inferences). A prediction based action can be performed based on model predictions. And as new training data is gathered, the model enhancement (re-training) occurs based on both the new and initial training data.

Figure 5:
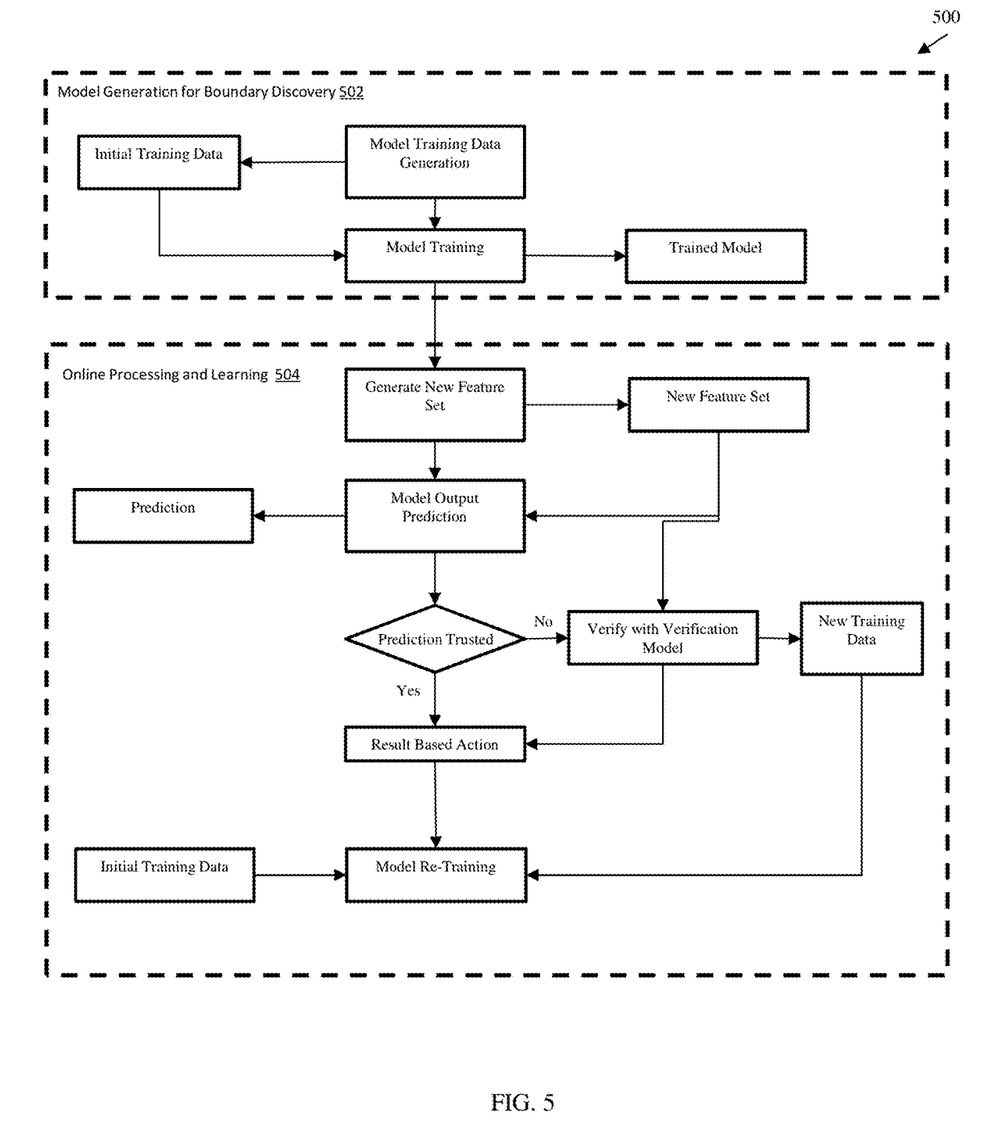
FIG. 5 depicts a flow diagram of training machine learning model in a verifiable prediction environment according to one or more embodiments of the invention.

In a verifiable prediction environment, a machine learning model's predictions can be verified with a more accurate model or verification engine. Herein, both a fast, but less accurate, machine learning model and a slower, but more accurate, verification model are considered. Because the verification model is more accurate than the machine learning model, it is utilized to generate the initial training data, the boundary enhancement training data, and for surrogate prediction during online processing. In the case where the verification model is a circuit simulator (or a problem domain specific simulator), it is considered to be precisely accurate. The machine learning model suffers from all the usual inaccuracies of a machine learning model. Embodiments of the invention focus on the enhancement of the classification accuracy of the machine learning model. The verification model can be orders of magnitude slower than the machine learning model. A prediction from the machine learning model can take a millisecond or less, but a simulation of a circuit (verification model) can take from less than a second to several hours. Using machine learning in a verifiable prediction environment can accelerate processes where only a verification model would otherwise be used. For example, many simulation problems require long run times to determine highly accurate Pass/Fail output classifications for a single set of input feature values. When simulation output is required for a large number of differing feature value sets, the required run time can be prohibitive. In such cases, a machine learning model can be used for fast inference for each input feature set, and full simulations are only required for machine learning model prediction verification when the model's predicted output is near its decision boundary (e.g., where the model Pass/Fail classification accuracy may be in question). Herein, a decision boundary can be a hypersurface that partitions the underlying vector space into two sets, one for each class. The classifier (machine learning model) will classify all the points on one side of the decision boundary as belonging to one class and all those on the other side as belonging to the other class. In this prediction environment, model training data can be generated, at will, by a verification model, where input feature values are selected from expected input value ranges. FIG. 5 depicts a flow diagram of training a machine learning model in a verifiable prediction environment according to one or more embodiments of the invention. During the model generation for boundary discovery 502 stage, initial model training data is produced by generating a number of input feature sets with differing feature values (for example, randomly selected feature values using feature probability density profiles), with corresponding trusted output values determined using a verification model. The initial trained model is fit from this training data.

In one or more embodiments, during the online prediction and learning (e.g., online processing) phase 504, new feature sets can be generated and predictions can be made in a processing loop using these newly generated feature sets. Since the model is not 100% accurate, some gauge of model output prediction accuracy is used to determine if the prediction can be trusted. If the prediction cannot be trusted (e.g. decision block results in a 'No'), to some level of confidence, the verification model is used to verify the result. The prediction (e.g., decision block results in a 'Yes'), or verified prediction (verified with verification model), the result is then used to perform some immediate result based action. Or, the action can be storing the result for later processing. Verification of predictions produces trusted data samples that can be used as new training data. The new training data can be combined with the initial training data to retrain the model, such that it incrementally becomes more accurate during the online process 504. The online prediction and learning phase 504 refers to machine learning in which data becomes available in a sequential order and is used to update our best predictor for future data at each step, as opposed to batch learning techniques which generate the best predictor by learning on the entire training data set at once. Online learning is a common technique used in areas of machine learning where it is computationally infeasible to train over the entire dataset. Computationally infeasible meaning the data set is too large to fit in a computer's main memory. By training the model in the verifiable prediction environment, the model is enhanced and becomes more accurate allowing for the online prediction and learning phase 504 to be more accurate when dealing with large data sets. When the model has been enhanced, the model can be utilized to analyze data sets to determine a decision result when the data set is inputted into the enhanced model.

Figure 6A:
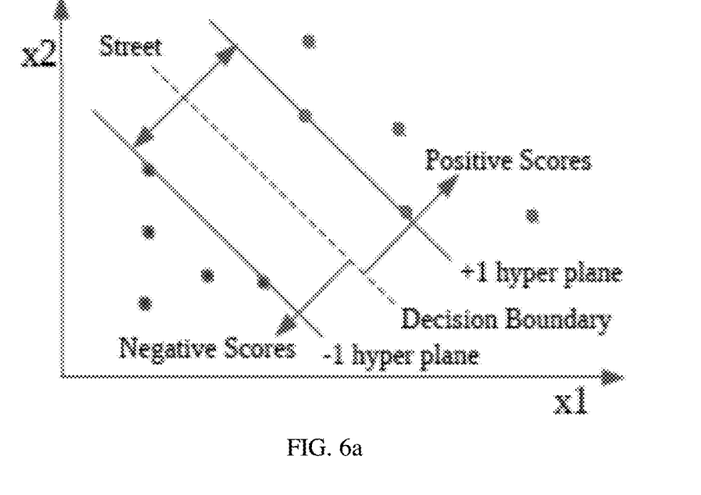
FIGS. 6a and 6b depict an example support vector machine (SVM) classification model's (SVC) decision boundary being enhanced with new training data according to one or more embodiments of the invention.
Figure 6B:
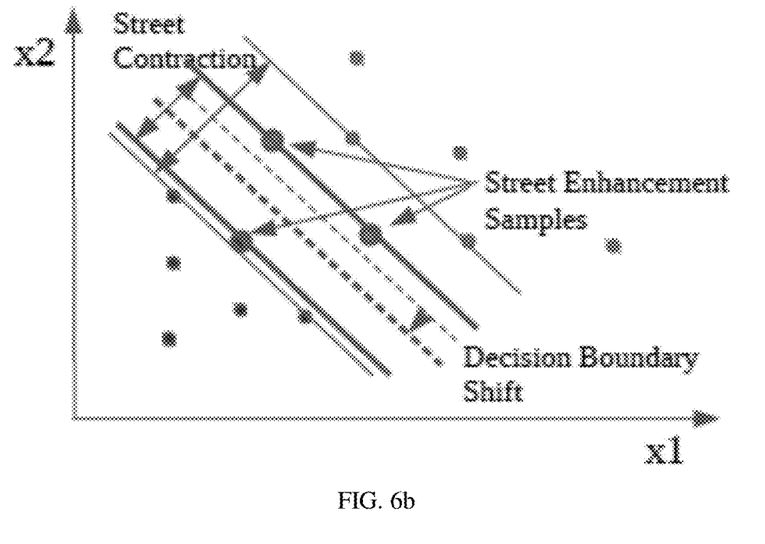

FIGS. 6a and 6b depict an example support vector machine (SVM) classification model's (SVC) decision boundary being enhanced with new training data according to one or more embodiments of the invention. In FIG. 6a, a street, and decision boundary are defined by initial training data. And in FIG. 6b, model enhancement samples contract the street and shift the decision boundary even though the street remains to be defined between scores of −1.0 and 1.0. As shown in FIG. 6a, when an SVC model is fit to training data, a decision boundary is established where the margin of the boundary is maximized (i.e., giving maximum separation between classification types). When classification is predicted for a new set of input feature values, it is determined by what the model predicts for the distance from the decision boundary. A positive distance will predict the type associated with +1 (Pass) and a negative distance will predict the type associated with −1 (Fail). The predicted distance is also known as the prediction score.

Figure 7:
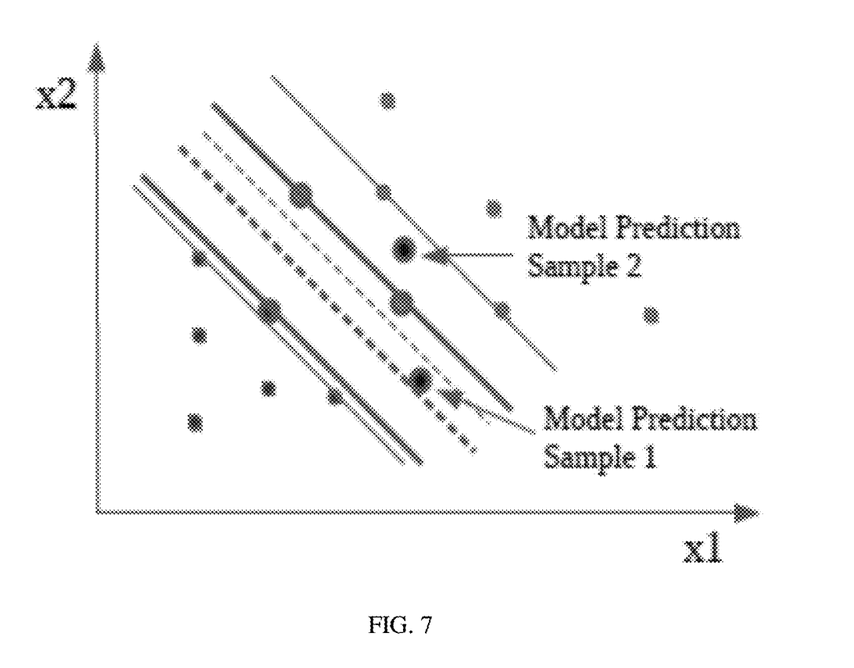
FIG. 7 depicts an exemplary SVM classification model's decision boundary illustrating mis-predictions according to one or more embodiments of the invention.

Model prediction scores that lie within the decision boundary margin (i.e., the street) have values between −1 and 1. This is the case no matter how wide the street is in terms of feature values, and is a characteristic of SVC models when determining if a prediction can be trusted. However, scores in the street are subject to mis-prediction. FIG. 7 depicts an exemplary SVM classification model's decision boundary illustrating mis-predictions. Classification predictions differ between the initial model and the enhanced model. Model prediction sample 1 is predicted as a Fail using the initial model, but as a Pass using the enhanced model. Model prediction sample 2 is predicted as a Pass using both models; however, since sample 2 lies outside of the street of the enhanced model, it might not be a candidate for a verification model verification, depending on the score verification limits employed. Online model decision boundary enhancement (through retraining) increases model classification accuracy over time, but, as seen in FIG. 7, a lessor accurate model will not only mis-predict near the decision boundary more often than an enhanced model, but with more verification model verifications.

Figure 8:
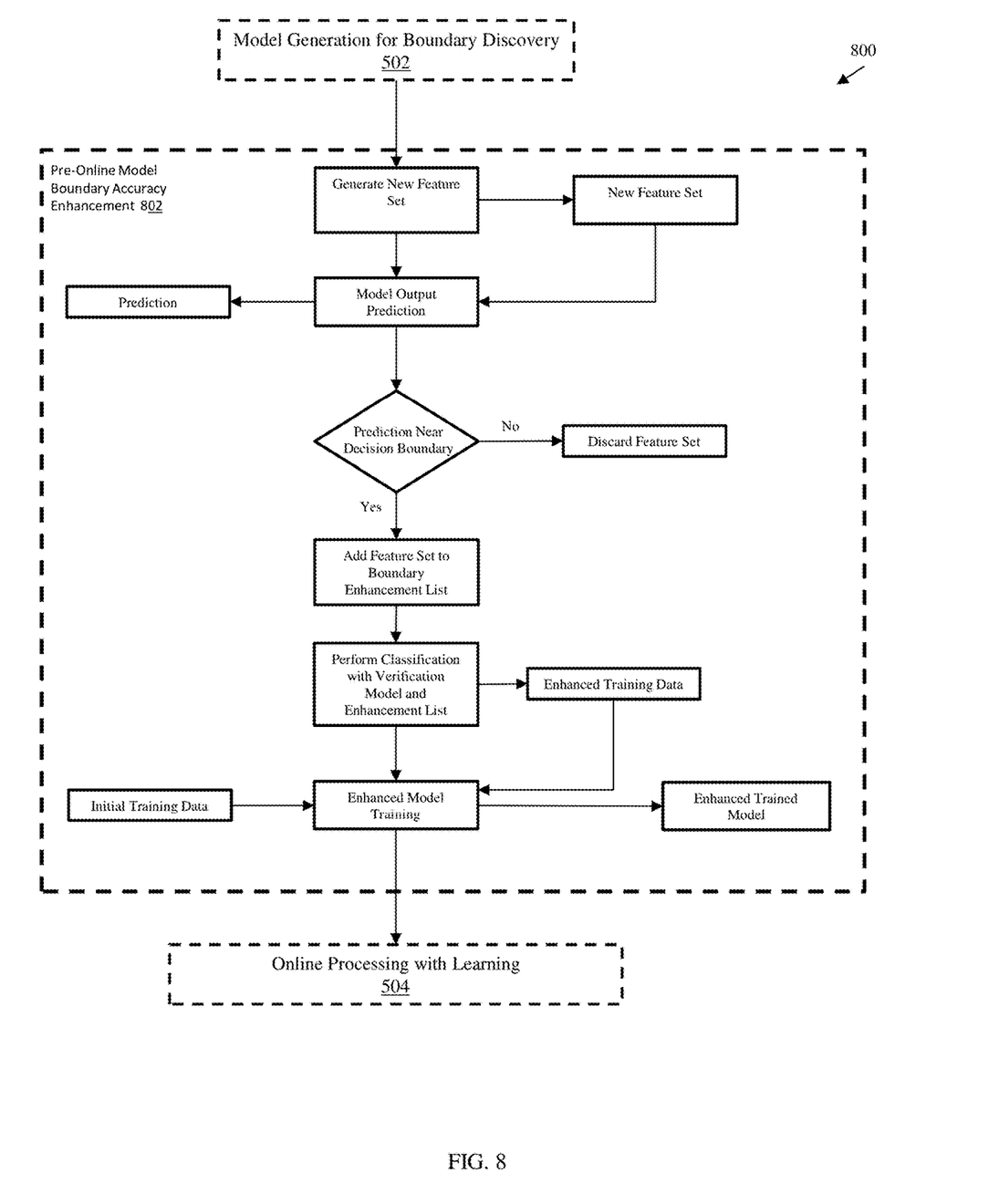
FIG. 8 depicts a flow diagram for accelerated machine learning model decision boundary enhancement in a verifiable prediction environment according to one or more embodiment of the invention.

In certain use cases, where there is a need for high accuracy for classification prediction at the beginning of the online process, so that excessive, and costly, verification can be minimized. Further, online learning with repeated model retraining can be proportionally expensive during the online process. Also, inaccurate classification predictions may never be corrected with verification, as the prediction trustworthiness gauge in itself cannot be 100% accurate (especially near the classification boundary). FIG. 8 depicts a flow diagram for accelerated machine learning model decision boundary enhancement in a verifiable prediction environment according to one or more embodiment of the invention. The flow diagram 800 includes a method for increasing model classification prediction accuracy near the classification boundary before the model prediction during the online process 504. When training data can be generated by a verification model, machine learning model classification accuracy at the decision boundary can be "accelerated" before the model is employed in an online environment. Due to the accuracy of the resulting initial model, online prediction verification is minimized and retraining may become optional. As shown in FIG. 8, model classification accuracy near the decision boundary can be enhanced, prior to the online process 504 by generating a number of input feature sets. In some embodiments, this generated input feature sets can be randomly generated. The new features are input into the initially trained model to determine feature classification scores (or otherwise, distance) that are within a threshold distance of the decision boundary. In some embodiments, this threshold distance can be the "street" described herein. With an SVC model, an enhancement feature set can be identified for boundary enhancement training data generation using the verification model, if the initial model classification prediction lies within the −1 to +1 street. This is arbitrary as one could use −2 to +2. Other types of models may have a different measure of prediction confidence (boundary distance). Some multiple of that distance would be used in a similar way, as determined by experimentation and decision boundary accuracy requirements. These feature sets that are within the threshold range (e.g., street) of the decision boundary are saved for processing and any feature sets outside the street or outside the threshold range (depending on how this threshold is defined) can be discarded. These feature sets within the decided range of the decision boundary are analyzed by the verification model to determine an enhanced training data. The flow diagram 800 includes creating a boundary enhanced model trained with both the initial and near boundary training data (enhanced training data). Pre-online model enhancement gives a more accurate decision boundary, and results in fewer costly verification model verifications during the online prediction and verification process. The initial broad training data is combined with the boundary targeted training data to retrain the model. This produces an enhanced model with an effective narrower street (narrower classification separation between known feature set classifications). How this is effected is shown in FIGS. 6 & 7. In a normal online environment, new training data comes in over time, and model accuracy can be incrementally improved over time with retraining. Embodiments of the invention aim to, in a verifiable prediction environment (machine learning model plus verification model), improve boundary accuracy (and therefore, prediction accuracy) prior to online processing of new sample feature sets.

In one or more embodiments, for an SVC, pre-online model enhancement can be performed as depicted in FIG. 8, but with the not-trusted boundary distance decision replaced. Instead of a prediction near decision boundary decision block, a determination that the SVC score is between −1 and 1 is made. That is to say, a determination of if an SVC model prediction can be trusted, or if it needs to be verification model verified. Since the SVC decision boundary margin (i.e., street) is always between (−1, 1), the entire pre-online model enhancement 802 can be performed iteratively using the same test relation until a desired classification accuracy is achieved. In one or more embodiments, SVM regression models (SVR) can be enhanced prior to online learning 504 in the same way, where continuous output values are first pre-classified using a classification threshold and then the process for SVC models is employed for model enhancement at the decision boundary. After the enhancement process, all training data (initial and enhancement continuous output values) are used to fit the final SVR regression model. Since regression model training is much more expensive than classification model training, this approach includes a technical benefit of speeding up regression model training when it needs to be highly accurate at a decision boundary.

Further technical benefits of the processes described herein include reducing the number of model mis-predictions near the decision boundary, reducing the number of costly verification (i.e., lower verification to prediction ration), and the accuracy of the pre-online model may be sufficient such that the online model retraining is not needed.

Figure 9:
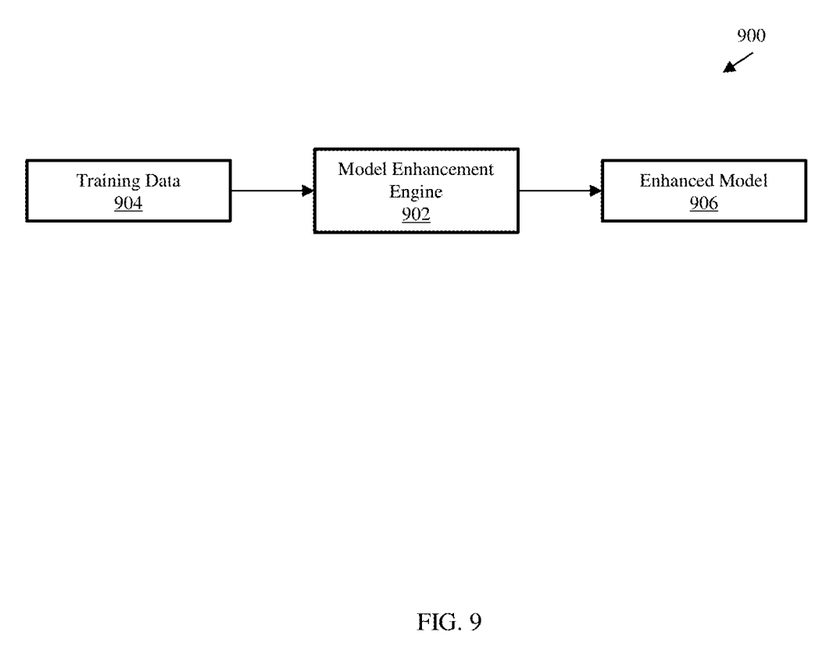
FIG. 9 depicts a system for accelerated machine learning model decision boundary enhancement in a verifiable prediction environment according to one or more embodiment of the invention.

FIG. 9 depicts a system for accelerated machine learning model decision boundary enhancement in a verifiable prediction environment according to one or more embodiment of the invention. The system 900 includes a model enhancement engine 902 that can receive training data 904 as an input to generate an enhanced model 906. The model enhancement engine 902 is configured to perform the processing steps from FIGS. 4, 5, and 8. The training data 904 can include model training data, an initial training data, enhanced training data, and online training data. The enhanced model 906 can be an enhanced machine learning model include, but not limited to, SVM, SVR, SVC, and the like. This enhanced model 906 can be utilized to make predictions based on feature sets extracted from data to make predictions (inferences) about the data based on the training data 904 and the enhancements to boundary decisions by the model enhancement engine 902. In one or more embodiments of the invention, the enhancement 902 can be implemented on the processing system 300 found in FIG. 3. Additionally, the cloud computing system 50 can be in wired or wireless electronic communication with one or all of the elements of the system 900. Cloud 50 can supplement, support or replace some or all of the functionality of the elements of the system 900. Additionally, some or all of the functionality of the elements of system 900 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 10:
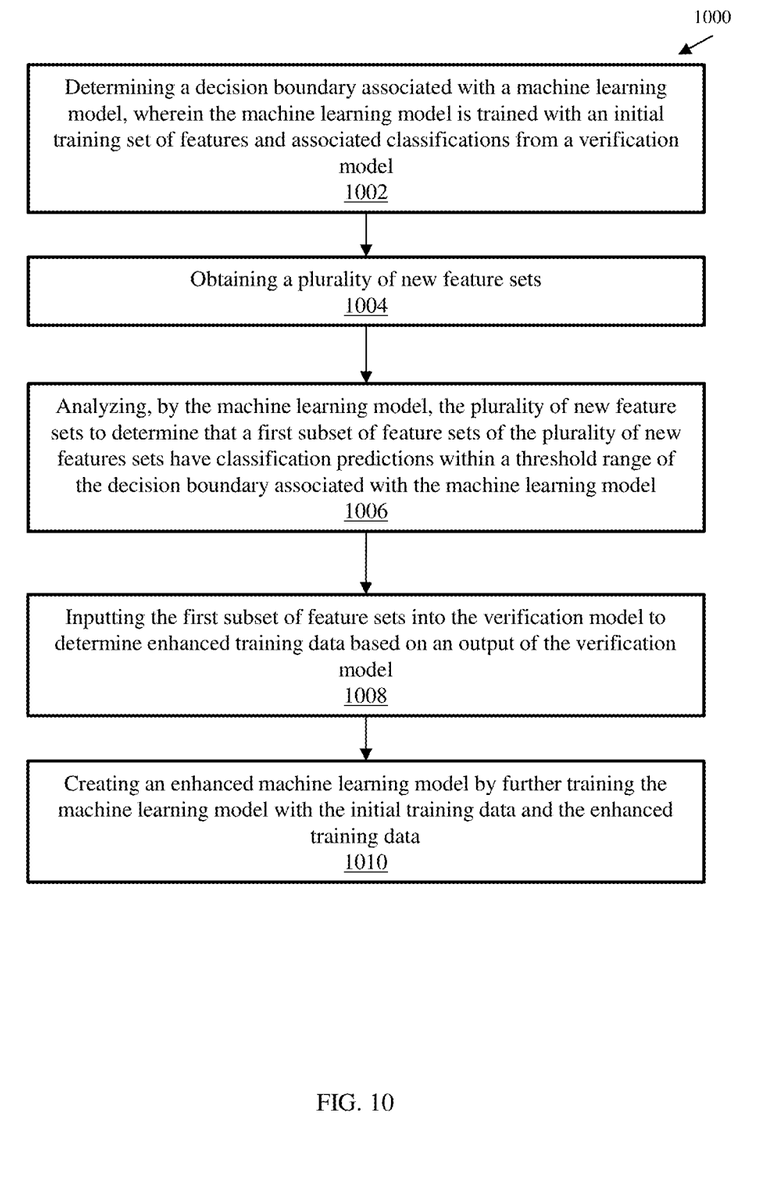
FIG. 10 depicts a flow diagram of a method for boundary decision enhancement according to one or more embodiments of the invention.

FIG. 10 depicts a flow diagram of a method for boundary decision enhancement according to one or more embodiments of the invention. The method 1000 includes determining a decision boundary associated with a first machine learning model, wherein the first machine learning model is trained with an initial training set of features and associated classifications from a verification model, as shown in block 1002. At block 1004, the method 1000 includes obtaining a plurality of new feature sets. In one or more embodiments, the plurality of new features sets can be randomly generated for use or can obtain from a knowledge base or other source. The method 1000 also includes analyzing, by the first machine learning model, the plurality of new feature sets to determine that a subset of feature sets of the plurality of new features sets have classification predictions within a threshold range of the decision boundary associated with the first machine learning model, as shown in block 1006. At block 1008, the method 1000 includes inputting the subset of feature sets into the verification model to determine enhanced training data based on the determined outputs of the verification model. For example, the verification model can be a problem domain specific model such as a circuit simulator. The method 1000 also includes creating an enhanced machine learning model by further training the first machine learning model with the initial training data and the enhanced training data. In some embodiments, creating the enhanced machine learning model includes adjusting the parameters associated with the first machine learning model based on the training data that was enhanced training data as well as the initial training data.

Additional processes may also be included. It should be understood that the processes depicted in FIG. 10 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining a decision boundary associated with a machine learning model, wherein the machine learning model is trained with an initial training set of features and associated classifications from a verification model;
    obtaining a plurality of new feature sets;
    analyzing, by the machine learning model, the plurality of new feature sets to determine that a subset of feature sets of the plurality of new features sets have classification predictions within a threshold range of the decision boundary associated with the machine learning model;
    inputting the subset of feature sets into the verification model to determine enhanced training data based on associated outputs of the verification model;
    creating an enhanced machine learning model by further training the machine learning model with the initial training data and the enhanced training data;
    receiving a data set; and
    determining a decision result from the data set based least in part on the enhanced machine learning model.

2. The method of claim 1, further comprising:
    iteratively enhancing the enhanced machine learning model by:
        obtaining a plurality of second feature sets;
        analyzing, by the enhanced machine learning model, the plurality of second feature sets to determine that a next subset of feature sets of the plurality of second feature sets have classification predictions within a second threshold range of the decision boundary associated with the machine learning model;
        inputting the second subset of feature sets into the verification model to determine second enhanced training data based on second outputs of the verification model; and
        further enhancing the enhanced machine learning model by further training the enhanced machine learning model with the second enhanced training data.

3. The method of claim 1, wherein the machine learning model is less accurate than the verification model.

4. The method of claim 1, wherein the machine learning model is faster than the verification model.

5. The method of claim 1, wherein the enhanced training data comprising training data within the threshold range of the decision boundary.

6. The method of claim 1, further comprising training the machine learning model utilizing online processing.

7. The method of claim 1, further comprising:
    determining a subset of feature sets of the plurality of features sets is not within a threshold range of the decision boundary associated with the machine learning model; and
    discarding the subset of feature sets.

8. The method of claim 1, the machine learning model comprising a support vector classification model.

9. A system for decision boundary enhancement comprising:
    a processor communicatively coupled to a memory, the processor configured to:
        determine a decision boundary associated with a machine learning model, wherein the first machine learning model is trained with an initial training set of features and associated classifications from a verification model;
        obtain a plurality of new feature sets;
        analyze, by the first machine learning model, the plurality of new feature sets to determine that a subset of feature sets of the plurality of new features sets having classification predictions within a threshold range of the decision boundary associated with the first machine learning model;
        input the subset of feature sets into the verification model to determine enhanced training data based on outputs of the verification model;
        create an enhanced machine learning model by further training the first machine learning model with the initial training data and the enhanced training data;
        receive a data set; and
        determine a decision result from the data set based least in part on the enhanced machine learning model.

10. The system of claim 9, wherein the first machine learning model is less accurate than the verification model.

11. The system of claim 9, wherein the machine learning model is faster than the verification model.

12. The system of claim 9, wherein the enhanced training data comprising training data within the threshold range of the decision boundary.

13. The system of claim 9, wherein the processor is further configured to train the machine learning model utilizing online processing.

14. The system of claim 9, wherein the processor is further configured to:
    determine a subset of feature sets of the plurality of features sets is not within a threshold range of the decision boundary associated with the machine learning model; and
    discard the subset of feature sets.

15. A computer program product for decision boundary enhancement, the computer program product comprising a computer readable storage medium having program instructions embodied therewith, the program instructions executable by a processor to cause the processor to perform a method comprising:
    determining a decision boundary associated with a first machine learning model, wherein the first machine learning model is trained with an initial training set of features and associated classifications from a verification model;
    obtaining a plurality of new feature sets;
    analyzing, by the first machine learning model, the plurality of new feature sets to determine that a subset of feature sets of the plurality of new features sets have classification predictions within a threshold range of the decision boundary associated with the first machine learning model;
    inputting the subset of feature sets into the verification model to determine enhanced training data based on an output of the verification model;
    creating an enhanced machine learning model by further training the first machine learning model with the initial training data and the enhanced training data;
    receiving a data set; and
    determining a decision result from the data set based least in part on the enhanced machine learning model.

16. The computer program product of claim 15, wherein the first machine learning model is less accurate than the verification model.

17. The computer program product of claim 15, wherein the first machine learning model is faster than the verification model.

18. The computer program product of claim 15, wherein the enhanced training data comprising training data within the threshold range of the decision boundary.

19. The computer program product of claim 15, further comprising training the machine learning model utilizing online processing.

20. The computer program product of claim 15, further comprising:
    determining a subset of feature sets of the plurality of new features sets is not within a threshold range of the decision boundary associated with the first machine learning model; and
    discarding the subset of feature sets.

\* \* \* \* \*